(12) United States Patent
Engelhardt

(10) Patent No.: US 7,018,042 B2
(45) Date of Patent: Mar. 28, 2006

(54) SCANNING MICROSCOPE HAVING AN OPTICAL COMPONENT, AND OPTICAL COMPONENT

(75) Inventor: Johann Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 10/618,345

(22) Filed: Jul. 11, 2003

(65) Prior Publication Data
US 2004/0012858 A1    Jan. 22, 2004

(30) Foreign Application Priority Data
Jul. 12, 2002 (DE) .................. 102 31 475

(51) Int. Cl.
G02B 27/14 (2006.01)
(52) U.S. Cl. .............. 351/634; 359/639; 359/368; 359/382
(58) Field of Classification Search .............. 359/629, 359/634, 639, 640, 368, 382, 384, 839
See application file for complete search history.

(56) References Cited

U.S. PATENT DOCUMENTS

| | | | | |
|---|---|---|---|---|
| 5,022,743 A | * | 6/1991 | Kino et al. ................. | 359/235 |
| 5,418,769 A | * | 5/1995 | Inoue ..................... | 369/112.28 |
| 5,861,984 A | * | 1/1999 | Schoppe ................... | 359/385 |
| 6,525,812 B1 | | 2/2003 | Hartmann et al. ......... | 356/318 |
| 6,525,828 B1 | * | 2/2003 | Grosskopf ................ | 356/613 |
| 2002/0008904 A1 | | 1/2002 | Engelhardt ............... | 359/368 |
| 2002/0043618 A1 | | 4/2002 | Storz et al. ............... | 250/234 |
| 2003/0184854 A1 | * | 10/2003 | Kamimura et al. ........ | 359/368 |
| 2004/0218280 A1 | * | 11/2004 | Nevis ...................... | 359/629 |

FOREIGN PATENT DOCUMENTS

| | | |
|---|---|---|
| DE | 19944355 | 3/2001 |
| DE | 10033549 | 1/2002 |
| DE | 10042114 | 3/2002 |
| WO | 9202839 | 2/1992 |

* cited by examiner

Primary Examiner—Huy Mai
(74) Attorney, Agent, or Firm—Davidson, Davidson & Kappel, LLC

(57) ABSTRACT

An optical component is arranged in the beam path of a scanning microscope. The optical component has a plane entrance surface through which a light beam bundle can be incoupled at an entrance angle, and a plane exit surface through which the light beam bundle can be outcoupled at an exit angle, which is different from the entrance angle. The optical component contains at least two elements that exhibit at least two different refractive indices.

18 Claims, 3 Drawing Sheets

SCANNING MICROSCOPE HAVING AN OPTICAL COMPONENT, AND OPTICAL COMPONENT

CROSS REFERENCE TO RELATED APPLICATIONS

This application claims priority to German patent application 102 31 475.6, the subject matter of which is hereby incorporated by reference herein.

FIELD OF THE INVENTION

The invention concerns a scanning microscope and an optical component.

BACKGROUND OF THE INVENTION

In scanning microscopy, a specimen is illuminated with a light beam in order to observe the reflected or fluorescent light emitted from the specimen. The focus of an illuminating light beam is moved in a specimen plane by means of a controllable beam deflection device, generally by tilting two mirrors, the deflection axes usually being perpendicular to one another so that one mirror deflects in the X direction and the other in the Y direction. Tilting of the mirrors is brought about, for example, by means of galvanometer positioning elements. The power level of the light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels back through the beam deflection device to the beam splitter, passes through it, and is then focused onto the detection pinhole behind which the detectors are located. Detected light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers, the track of the scanning light beam on or in the specimen ideally describing a meander (scanning one line in the X direction at a constant Y position, then stopping the X scan and slewing by Y displacement to the next line to be scanned, then scanning that line in the negative X direction at constant Y position, etc.). To allow the acquisition of image data in layers, the specimen stage or the objective is shifted after a layer has been scanned, and the next layer to be scanned is thus brought into the focal plane of the objective.

In many applications, specimens are prepared using a plurality of markers, for example several different fluorescent dyes. These dyes can be excited sequentially, for example with illuminating light beams that have different excitation wavelengths. Simultaneous excitation using an illuminating light beam that contains light of several excitation wavelengths is also common. European Patent Application EP 0 495 930 "Confocal microscope system for multi-color fluorescence," for example, discloses an arrangement having a single laser emitting several laser lines. In practical use at present, such lasers are most often embodied as mixed-gas lasers, in particular as ArKr lasers.

Aberrations attributable to interference phenomena often occur in scanning microscopy. These interferences are usually caused by multiple reflections at various optical interfaces within the scanning microscope.

German Unexamined Application DE 100 42 114.8 A1 discloses a method for illuminating a specimen with light of a laser light source, preferably in a confocal scanning microscope. With the method, the coherence length of the laser light can be decreased so that troublesome interference phenomena in the image can be largely eliminated. If interference phenomena nevertheless do occur, they are to be influenced in such a way that they have no influence on detection. The method according to the invention is characterized in that the phase length of the light field is varied, using a modulation means, in such a way that interference phenomena in the optical beam path occur not at all, or only to an undetectable extent, within a definable time interval.

The method disclosed in the Unexamined Application is laborious in particular for high measurement speeds or images, and because of the special requirements in terms of illumination poses difficulties in terms of changing in the illuminating wavelength, or indeed illuminating with light containing multiple wavelengths.

SUMMARY OF THE INVENTION

It is an object of the present invention to provide a scanning microscope in which aberrations caused by troublesome interferences are avoided, and which at the same time allows a change in the illuminating light wavelength or detected light wavelength, or simultaneous illumination of the specimen with an illuminating light beam having several wavelengths, or simultaneous detection of detected light of several wavelengths, in largely error-free fashion.

The present invention provides a scanning microscope comprising an optical component, arranged in the beam path, that comprises a plane entrance surface through which a light beam bundle can be incoupled at an entrance angle, and a plane exit surface through which the light beam bundle can be outcoupled at an exit angle, whereby the optical component contains at least two elements that exhibit at least two different refractive indices; and the entrance angle and exit angle are different.

Another object of the invention is to provide an optical component that can be positioned in a beam path with no occurrence of troublesome interferences.

The invention also provides an optical component comprising at least two elements that exhibit at least two different refractive indices and that define a plane entrance surface through which a light beam bundle can be incoupled at an entrance angle and a plane exit surface through which the light beam bundle can be outcoupled at an exit angle, whereby the entrance angle is different from the entrance angle and whereby partial beam bundles divided from the light beam bundle by the optical element are sufficiently spatially separated from the light beam bundle that they do not interfere with the light beam bundle.

The invention has the advantage of making possible an improvement in image quality simultaneously with flexible usability in terms of the illuminating light wavelength and detected light wavelength.

In an embodiment, the light beam bundle is not deflected or is not substantially deflected by the optical component, so that the total deflection is less than 5 degrees. This has the advantage that the optical component can be introduced into the beam path in place of other optical elements that exhibit a largely continuous beam profile.

The exit angle is preferably identical for at least two wavelengths. In the interest of strict correctness, it should be clarified that the entrance angle and exit angle are angles of the light beam bundle with respect to the surface normal line.

In an embodiment, the interferences are avoided by placing the entrance and/or exit surface of the optical component obliquely, in which context the dispersion effect occurring because of the oblique placement can be compensated for by the fact that the optical component is achromatically corrected. In a particular embodiment, the optical component comprises at least two optical media each having a different refractive index, which can be embodied e.g. as wedges that preferably are combined into a double wedge. The properties and shape of the optical media, such as for example the refractive index, wedge angle, or thickness, are selected in such a way that a light beam bundle having different wavelengths follow the same optical axis after emergence from the optical component.

In another embodiment in which the light beam bundle comprises at least two portions of differing wavelengths, the invention has the particular advantage that portions of the light beam bundle of differing wavelengths extend collinearly after exiting from the optical component.

In an embodiment, the optical component is a beam splitter. The latter can additionally, for example, be provided for dividing a reference beam out of the illuminating light beam in order to measure, monitor, or control the current illuminating light power level, optionally in wavelength-specific fashion.

In another embodiment, the beam splitter serves to separate the illuminating light beam physically from the detected light beam. In this variant, in particular, the beam splitter can be embodied functionally as a beam splitter cube with no occurrence of the troublesome interferences.

In an embodiment, the optical component is a beam deflection device. The latter is preferably of monolithic configuration and can, for example, be embodied as a K-scanner. A K-scanner is known, for example, from German Unexamined Application DE 100 33 549.7 A1. In an embodiment, the beam deflection device is assembled from prisms that are arranged rotatably or pivotably. The prisms are preferably cemented to one another. The shape and optical properties of the prisms, in particular their refractive indices, angles, and passthrough lengths, are coordinated with one another in such a way that illuminating and/or detected light beams having differing wavelengths follow the same optical axis after emerging from the beam deflection device as in the conventional component, but without troublesome interferences.

In an embodiment, the optical component comprises at least two optical media each having a different refractive index, and an air gap can exist between the media. In a particular embodiment, the optical component contains a double wedge.

The optical component is preferably embodied in such a way that a light beam bundle comprises at least two portions of differing wavelength; and that the portions of differing wavelength extend collinearly after exiting from the optical component.

In an embodiment, the optical component contains an acoustooptical component. Acoustooptical components are known, for example, as acoustooptical filters. Mentioned here merely by way of example is German Unexamined Application 199 44 355.6 A1, which discloses a scanning microscope having an acoustooptical component for coupling in an illuminating light beam and coupling out a detected light beam.

In another embodiment, the scanning microscope is a confocal scanning microscope.

BRIEF DESCRIPTION OF THE DRAWINGS

The subject matter of the invention is depicted schematically in the drawings and will be described below with reference to the Figures, identically functioning components being labeled with the same reference characters. In the drawings.

DETAILED DESCRIPTION OF THE INVENTION

Figure 1:
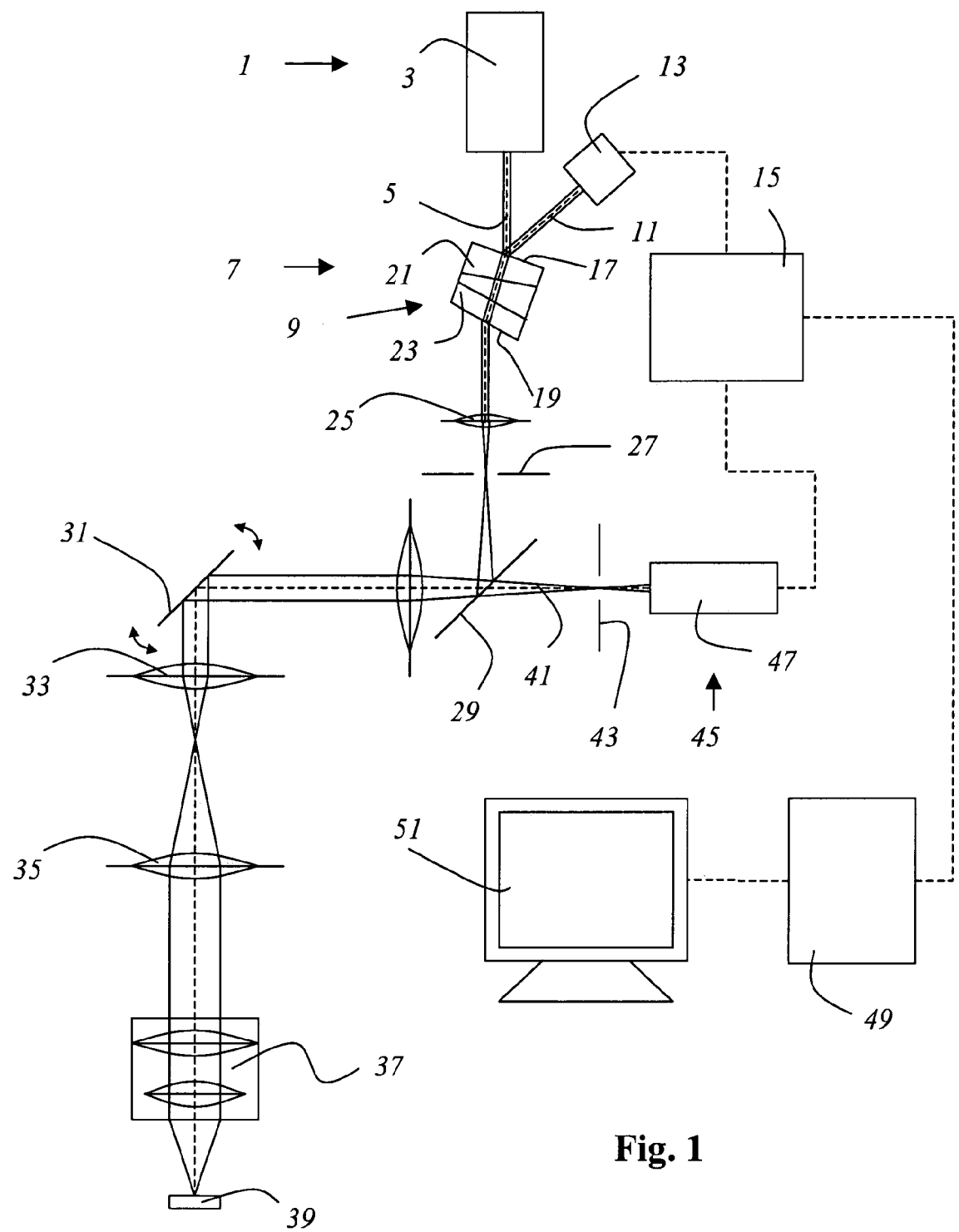
FIG. 1 shows a scanning microscope according to the present invention.

FIG. 1 schematically shows a scanning microscope according to the present invention that is embodied as a confocal scanning microscope. Illuminating light beam 5 coming from a light source 1, which is embodied as a multiple-line laser 3, strikes an optical component 7 that is embodied as a beam splitter 9. Beam splitter 9 splits out from illuminating light beam 5, in interference-free fashion, a reference light beam 11 that is detected using a reference detector 13. Reference detector 13 generates an electrical reference signal, proportional in amplitude to the light power level of reference light beam 11, that is transferred to a processing unit 15 for monitoring the illuminating light power level. Beam splitter 9 has an entrance surface 17 and an exit surface 19, each of which illuminating light beam 5 strikes at an angle of incidence other than zero degrees. Beam splitter 9 is configured, in terms of its shape and its optical properties, in such a way that portions of illuminating light beam 5 of differing wavelength extend collinearly after exiting from optical component 7. For that purpose, beam splitter 9 has a first element 21 and a further element 23 that are fitted to one another in cement-free fashion. Illuminating light beam 5 emerging from optical component 7 is focused by means of optical system 25 onto illuminating pinhole 27. After passing through illuminating pinhole 27, illuminating light beam 5 is directed by a beam splitter 29 to a gimbal-mounted scanning mirror 31 which guides illuminating light beam 5 through scanning optical system 33, tube optical system 35, and objective 37 and over or through specimen 39. Specimen 39 is labeled with several fluorescent dyes. In the case of non-transparent specimens 39, illuminating light beam 5 is guided over the specimen surface. With biological specimens 39 (preparations) or transparent specimens, illuminating light beam 5 can also be guided through specimen 39. Detected light beam 41 proceeding from specimen 39 travels through objective 37, tube optical system 35, and scanning optical system 33 and via scanning mirror 31 to beam splitter 29, passes through the latter, and after passing through detection pinhole 43 strikes a detector 45, which is embodied as multiband detector 47 and generates electrical detected signals proportional to the power level of detected light beam 41. These signals are forwarded to processing unit 15 and there correlated with the reference signal when image data are generated. The image data are transferred to a PC 49 which displays to the user, on its monitor 51, an image of the specimen. According to the present invention, no troublesome interferences occur that might degrade the image quality.

Figure 2:
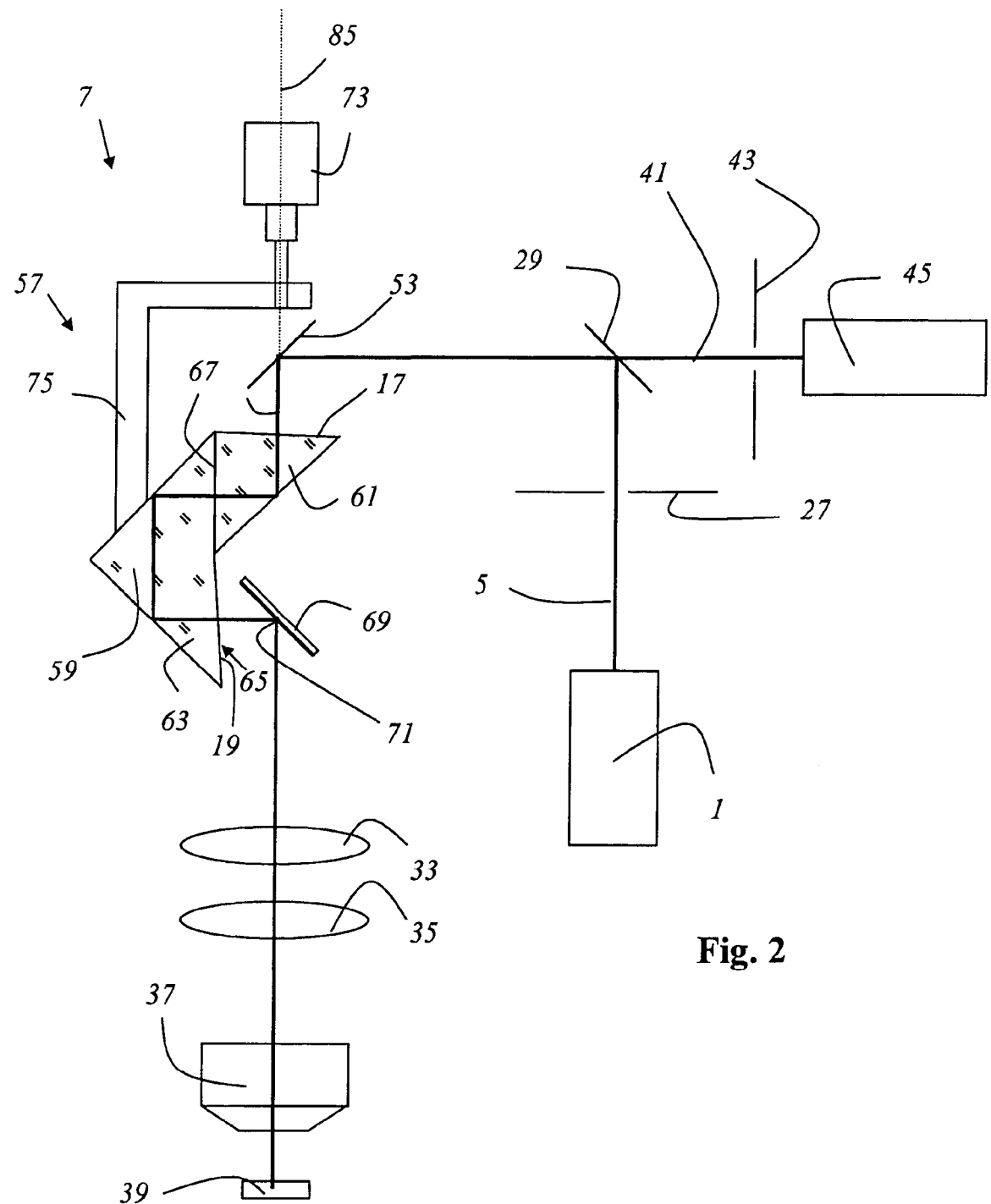
FIG. 2 shows a further scanning microscope according to the present invention.

FIG. 2 shows a further scanning microscope according to the present invention that is embodied as a confocal scanning microscope, having a light source 1 that emits a light beam 5 for illumination of a specimen 39. Light beam 5 is focused onto an illumination pinhole 27 and is then reflected by a dichroic beam splitter 29 and a subsequent reflecting mirror 53 to an optical component 7, namely a beam deflection device 57, which guides light beam 5 through scanning optical system 33, tube optical system 35, and objective 37 and over or through specimen 39. Detected light beam 41 proceeding from specimen 39 travels through objective 37, via tube optical system 35 and scanning optical system 33, and through beam deflection device 57 to dichroic beam splitter 29, passes through the latter and detection pinhole 43 that follows, and lastly arrives at detector 45, which is embodied as a photomultiplier. In detector 45, electrical detected signals proportional to the power level of detected light beam 41 proceeding from the specimen are generated. The specimen is scanned in layers in order to generate from the detected signals a three-dimensional image of specimen 39.

Beam deflection device 57 contains a rotatable deflection block 59 that is rotatable about first axis 85. Deflection block 59 is constituted by a prism 61 and a polygonal glass block 63 which is similar to a prism, the hypotenuse surface being constituted by a first surface 65 and a second surface 67 that are at an angle to one another. First surface 65 forms exit surface 19 of optical component 7. One short face of prism 61 is cemented onto second surface 67. The other short face forms entrance surface 17 of optical component 7. Illuminating light beam 5 always strikes entrance surface 17 and exit surface 19 of optical component 7 at an angle of incidence different from zero degrees. The hypotenuse surface of prism 61 constitutes a total reflection surface that deflects the illuminating light beam to glass block 63. Illuminating light beam 5 is reflected two more times in glass block 63 by total reflection, and after leaving glass block 63 strikes a scanning mirror 69 that is rotatable about second axis 71. By rotation of deflection block 59 about first axis 85, light beam 5 is deflected perpendicular to the paper plane. Rotation of scanning mirror 69 about second axis 71 causes a deflection of light beam in the plane of the drawing. A galvanometer drive 73, which moves deflection block 59 via arm 75, is provided for rotation of deflection block 59. Scanning mirror 69 is also driven by a galvanometer, which is not shown for the sake of clarity. The shape and optical properties of the deflection block are selected in such a way that illuminating light beams having different wavelengths follow the same optical axis after emerging from the optical component.

Certain optical elements for guiding and shaping the light beams are omitted from the Figure for better clarity. These are sufficiently familiar to one skilled in this art. With this variant as well, no troublesome interferences, and thus no aberrations or artifacts, occur.

Figure 3:
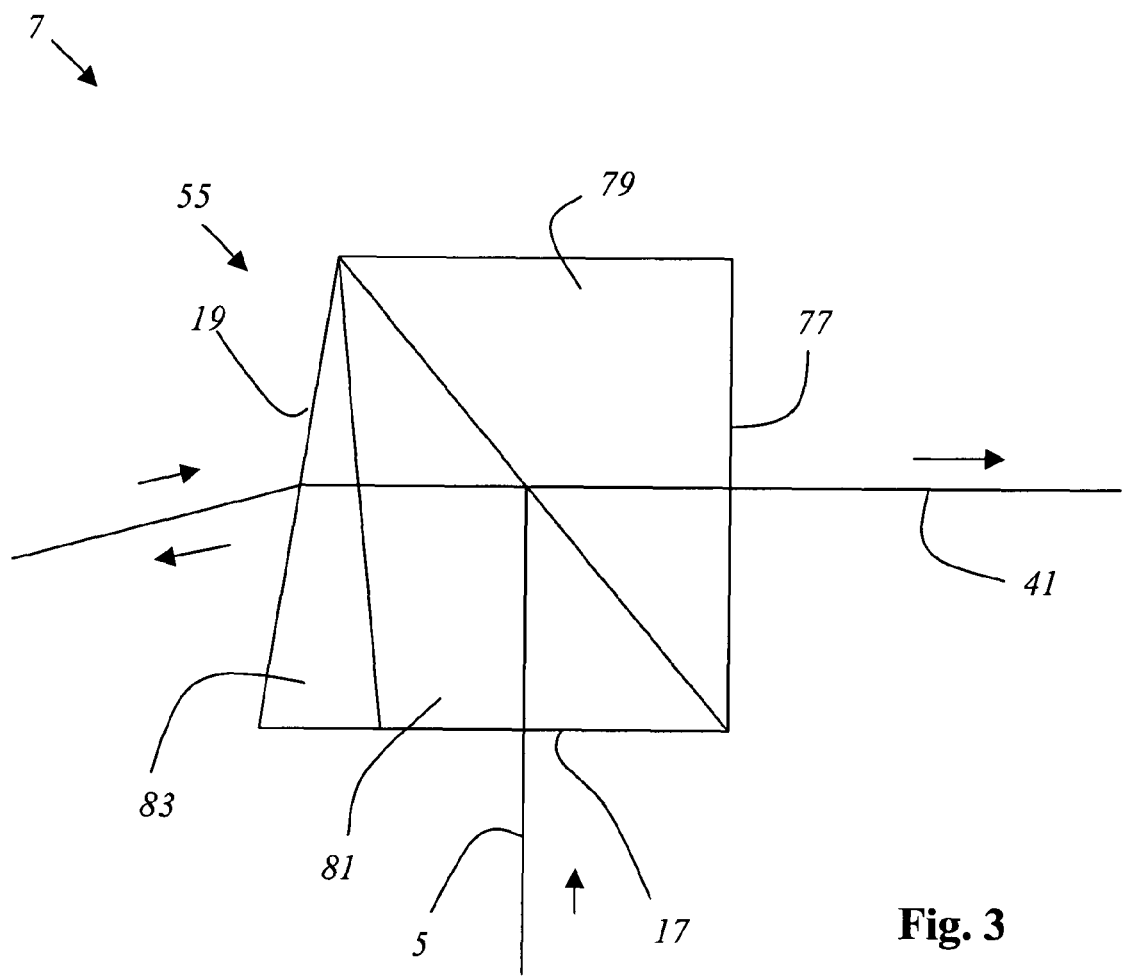
FIG. 3 is a detail view of a beam splitter.

FIG. 3 shows, as optical component 7, a further beam splitter 55 for a scanning microscope that is usable in particular for separating the beam paths of an illuminating light beam 5 and a detected light beam 41. The optical component has an entrance surface 17 and an exit surface 19 for illuminating light beam 5.

The beam splitter comprises three glass modules differing in shape and optical nature, namely a first glass module 79, a second glass module 81, and a third glass module 83. At the interface between the first and second glass modules, illuminating light beam 5 is reflected to exit surface 19, which it strikes at an angle of incidence different from zero degrees. The shape and optical properties of glass blocks 79, 81, 83 are selected so that illuminating light beams having different wavelengths follow the same optical axis after emerging from the optical component. Detected light beam 41 strikes the third glass block on the same optical axis in the opposite direction, the exit surface functioning for the detected light beam as entrance surface, which it strikes at an angle of incidence different from zero degrees. The detected light beam passes through the optical component and leaves it through further exit surface 77. The shape and optical properties of glass blocks 79, 81, 83 are selected so that both illuminating light beams 5 having different wavelengths and detected light beams 41 having different wavelengths respectively follow the same optical axis after emerging from the optical component. In the event that illuminating light beam 5 and/or detected light beam 41 respectively comprise portions having several wavelengths, those portions run in each case collinearly with one another even after passing through the optical component. Neither troublesome interferences nor troublesome spectral divisions occur.

The invention has been described with reference to a particular exemplary embodiment. It is self-evident, however, that changes and modifications can be made without thereby leaving the range of protection of the claims below.

What is claimed is:

1. A scanning microscope that defines a beam path, comprising an optical component, arranged in the beam path, that comprises a plane entrance surface through which a light beam bundle can be incoupled at an entrance angle, and a plane exit surface through which the light beam bundle can be outcoupled at an exit angle, whereby the optical component contains at least two elements that exhibit at least two different refractive indices; and the entrance angle and exit angle are different;

wherein the light beam bundle contains light of at least two wavelengths and wherein the exit angle is identical for the light of at least two wavelengths.

2. The scanning microscope as defined in claim 1, wherein the light beam bundle is not deflected by the optical component.

3. The scanning microscope as defined in claim 1, wherein the light beam bundle is deflected no more than 5 degrees by the optical component.

4. The scanning microscope as defined in claim 1, wherein the optical component is a beam splitter.

5. The scanning microscope as defined in claim 1, wherein the optical component is a beam deflection device.

6. The scanning microscope as defined in claim 1, wherein the optical component contains an acoustooptical component.

7. The scanning microscope as defined in claim 1, wherein the optical component is achromatically corrected.

8. The scanning microscope as defined in claim 1, wherein in the optical component contains a double wedge.

9. The scanning microscope as defined in claim 1, wherein the light beam bundle comprises at least two portions of differing wavelength; and the portions of differing wavelength extend collinearly after exiting from the optical component.

10. The scanning microscope as defined in claim 1, wherein the scanning microscope is a confocal scanning microscope.

11. An optical component comprising at least two elements that exhibit at least two different refractive indices and that define a plane entrance surface through which a light beam bundle can be incoupled at an entrance angle, and a plane exit surface through which the light beam bundle can be outcoupled at an exit angle, whereby the entrance angle and the exit angle are different and whereby partial beam bundles divided from the light beam bundle by the optical component are sufficiently spatially separated from the light beam bundle that they do not interfere with the light beam bundle;

wherein the light beam bundle contains light of at least two wavelengths and wherein the exit angle is identical for the light of at least two wavelengths.

12. The optical component as defined in claim 11, wherein the optical component is a beam splitter.

13. The optical component as defined in claim 11, wherein the optical component is a beam deflection device.

14. The optical component as defined in claim 11, wherein the optical component contains an acoustooptical component.

15. The optical component as defined in claim 11, wherein the optical component is achromatically corrected.

16. The optical component as defined in claim 11, wherein the optical component contains a double wedge.

17. The optical component as defined in claim 11, wherein the light beam bundle comprises at least two portions of differing wavelength; and the portions of differing wavelength extend collinearly after exiting from the optical component.

18. The optical component as defined in claim 11, wherein the optical component is positionable in a scanning microscope.

* * * * *

UNITED STATES PATENT AND TRADEMARK OFFICE
CERTIFICATE OF CORRECTION

PATENT NO. : 7,018,042 B2  Page 1 of 1
APPLICATION NO. : 10/618345
DATED : March 28, 2006
INVENTOR(S) : Johann Engelhardt It is certified that error appears in the above-identified patent and that said Letters Patent is hereby corrected as shown below:

<u>Title page,</u>
Item [73], should read:
-- [73] Assignee: Leica Microsystems CMS GmbH, Wetzlar (DE) --.

Signed and Sealed this

Eleventh Day of July, 2006

JON W. DUDAS
*Director of the United States Patent and Trademark Office*